Figure 1:
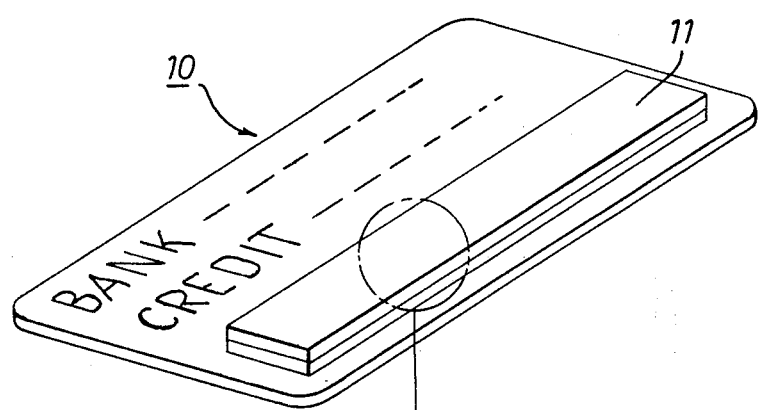
Figure 1:
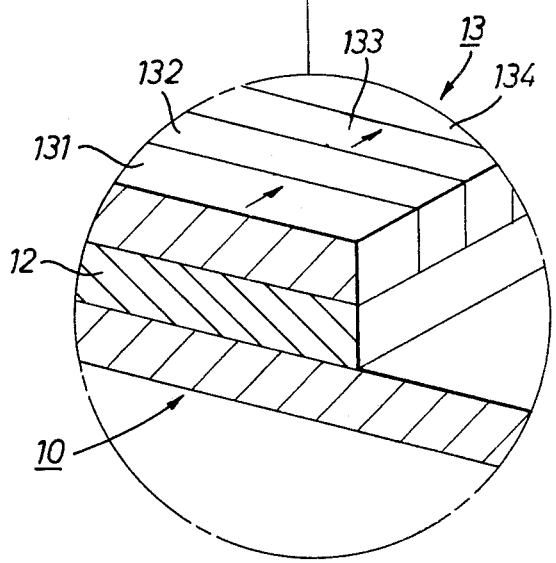

United States Patent [19]

Pearce

[11] 4,081,132
[45] Mar. 28, 1978

[54] CREDIT CARDS AND OTHER SECURITY DOCUMENTS

[75] Inventor: Ralph Reginald Pearce, West Drayton, England

[73] Assignee: E M I Limited, Middlesex, England

[21] Appl. No.: 516,988

[22] Filed: Oct. 22, 1974

[30] Foreign Application Priority Data

Oct. 23, 1973 United Kingdom ............... 49272/73

[51] Int. Cl.² ...................... G06K 19/06; G06K 7/08; B44D 1/02
[52] U.S. Cl. .................................. 235/493; 235/450; 340/149 A; 427/48
[58] Field of Search ............................. 360/131, 137; 235/61.11 D, 61.12 M, 61.12 R; 340/174 CB, 174 QB, 174 ZB, 149 A; 117/69

[56] References Cited

U.S. PATENT DOCUMENTS

| | | | |
|---|---|---|---|
| 3,015,807 | 1/1962 | Pohm | 340/174 ZB |
| 3,188,613 | 6/1965 | Fedde | 340/174 ZB |
| 3,328,195 | 6/1967 | May | 117/69 |
| 3,420,756 | 1/1969 | Terajima | 360/131 |
| 3,423,740 | 1/1969 | Barrekette | 360/131 |
| 3,566,356 | 2/1971 | Holm | 340/149 A |
| 3,803,634 | 4/1974 | Namikawa | 235/61.12 M |
| 3,873,975 | 3/1975 | Miklos | 340/149 A |
| 3,878,367 | 4/1975 | Fayling | 235/61.12 M |

FOREIGN PATENT DOCUMENTS 1,284,208 8/1972 United Kingdom.

*Primary Examiner*—Robert M. Kilgore
*Attorney, Agent, or Firm*—Fleit & Jacobson

[57] ABSTRACT

A security document has a carrier and two layers of magnetizable material one overlying the other, the carrier and layers being all bonded together. One layer is for the recording of information and the other layer has a magnetic structure which can be examined for verification purposes. A preferred method of making the structured layer is to deposit magnetizable material to form the layer within the influence of a magnetic field from a recording on the information layer which is of the form of the structure. The recording is erased when the structured layer has been formed. The security document may be a credit card, a bank note or other valuable paper.

10 Claims, 8 Drawing Figures

CREDIT CARDS AND OTHER SECURITY DOCUMENTS

This invention relates to security documents and to methods of producing them.

It has been proposed that security documents, that is documents whose authenticity must be verifiable, including credit cards, passport or keys, bank notes, cheques and share certificates, should include a magnetic medium in which information is recorded eg the identity of a credit card carrier and the amount for which the card may be presented. It is also believed that conventional magnetic editing techniques and media could be used to modify data on a card so that it could be used fraudulently. It would be desirable therefore to have on a security document a magnetic record which would be very difficult to alter or remove without mutilation.

It is an object of the present invention to provide an improved security document and the like.

It is a further object to provide a method of making such an improved document.

According to the invention there is provided a security document including a carrier and two layers of magnetisable material one overlying the other, the carrier and the layers being all bonded together, and the layers being an information layer and a magnetically structured verification record layer.

According to another aspect of the invention there is provided a method of making a security document including the steps of providing a first layer of magnetisable material, magnetising the layer with a verification record, depositing magnetisable material within the influence of the remanant magnetic field of the first layer to form with said verification record, the first and second layers being bonded to a carrier forming part of said document. There is also provided a method of making a medium including the steps of magnetically recording signals in predetermined regions on a first layer of magnetic material on a support, and forming a second layer of magnetic material on said first layer, the arrangement being such that said second layer is orientated in said predetermined regions by the magnetic fields of the signals recorded on said first layer.

In order that the invention may be clearly understood and readily carried into effect, the same will now be described, by way of example only, with reference to the accompanying drawings in which FIG. 1 shows a credit card and FIGS. 2a to 2f show stages in the making of a card similar to that of FIG. 1.

Referring to FIG. 1 a security document, such as a credit card 10, has a magnetic medium 11 of two layers 12 and 13 laid on the card as substrate. Layer 12 is an information and layer 13 is a verification layer or watermark layer with fixed domains or areas 131, 132, 133, 134. The verification record layer is securely bonded into the medium and cannot be tampered with without damaging the medium.

Conveniently, magnetic storage media, such as 11 can be produced starting from conventional, commercially available magnetic recording tapes. Such tapes (FIG. 2) typically comprise a thin support of plastics material 1 having a layer 2, some 5-10 micron thick, of magnetic particles, such as acicular gamma ferric oxide, in a binder. In audio recording tapes, as shown diagrammatically in FIG. 2b, the magnetic particles are orientated longitudinally of the tape, while in video recording tapes the magnetic particles are orientated transversely of the tape. The orientation is made while the binder is still fluid. The following description is based on the use of an audio recording tape as shown in FIG. 2b.

Figure 2:
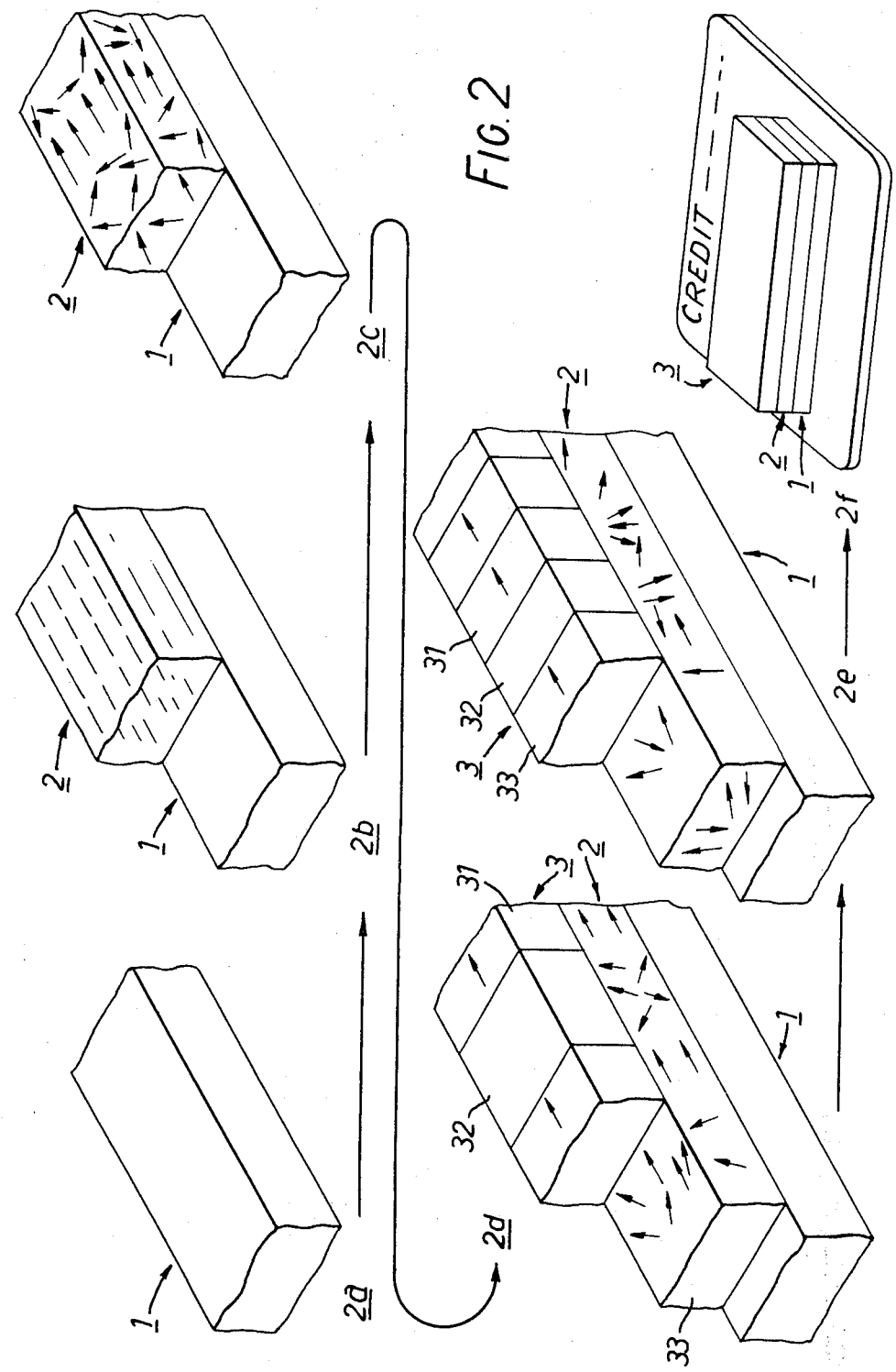

Signals are magnetically recorded at saturation level in selected regions of the tape in accordance with a predetermined pattern or code as shown diagrammatically by the arrows in FIG. 2c. The tape can be magnetised using a conventional recording head and transport mechanism and supplying the head with a suitable signal to produce the magnetised and unmagnetised regions. If required all the regions can be magnetised but in distinct senses. The tape is then placed in a vacuum chamber and a thin layer of magnetic metal or alloy 3 (some 0.5 microns thick) is evaporated onto the magnetic layer of the tape FIG. 2d). Suitable magnetic metals and alloys include iron, cobalt, iron-cobalt alloys and nickel-iron alloys. As the metal vapour impinges on the magnetic layer and condenses, it cools through its Curie temperature and becomes magnetisable. The magnetic domains nucleating in the metal layer take up the magnetisation pattern of the magnetic layer onto which the metal vapour is condensing as shown diagrammatically by the arrows in FIG. 2. In other words, in those selected regions where the signals have been recorded on the tape, the domains 31, 32, 33 in the metal layer become directionally orientated by the magnetic fields of the recorded signals, while in those regions where no signals were recorded on the tape, the domains do not become directionally orientated, i.e. they are randomly orientated. There are thus formed in the metal layer a plurality of regions or islands having a predetermined orientation at those positions where a signal was recorded on the conventional magnetic tape. The use of the evaporative technique ensures that the material makes a secure bond to the surface on which it is deposited. This bond assists in preventing fraudulent simulation by removing a genuine watermark verification layer to a spurious card.

The composite tape is then removed from the evaporation chamber and demagnetised FIG. 2e. Although the pattern or code contained in the metal layer is demagnetised it is not destroyed since it is not merely a magnetic recording but a physical structuring of the metal layer built thereinto in the manner of a watermark represented by the arrows of FIG. 2e. The pattern or code can be developed by passing the composite tape over a permanent magnet to saturate the magnetic material. The pattern or code can then be detected by any suitable means. This "magnetically watermarked" composite tape comprises a magnetic storage medium and can be used to provide security measures for such members as security or credit cards, bank-notes, bank cheques, and other security documents by fixing the coded magnetic storage medium to, or incorporating it in, the members, for example as shown in FIG. 2f.

The security document thus formed has both a verification in the form of the structured layer, and space for the recording of information in the form of the layer magnetised during the production of the structured layer and subsequently wiped clear by demagnetisation.

In another embodiment of the present invention, the magnetic storage medium may be formed by providing a first layer of a magnetic metal or alloy on a support, such as a tape or card. Magnetic signals are then recorded in selected areas of the first layer in the form of a pattern or code. A second layer of a magnetic metal or alloy is then evaporated onto the first layer in the manner, and with the results, previously described. The pattern or code may be the alignment of some regions of the layer in a particular direction. Additionally other regions may be aligned in another direction. Unaligned regions may be left in the random alighment produced on deposition.

It is preferred to employ a metal or alloy for at least the second layer since metals and alloys are more readily orientated as they condense from the vapour state than fluid suspension coatings of magnetic particles which usually require a greater magnetic field to orientate the particles. However in carrying out the method described it is only necessary that the second layer be such that it can be orientated by the magnetically recorded signals in the selected areas of the first layer.

The first layer maybe formed in the substrate as a so-called "integral" tape.

The magnetic field required to orientate magnetic particles in a dispersion to a substantial degree is related to the coercivity of the magnetic particles and is generally in the region of a few hundred oersteds for conventional magnetic coatings. On the basis of calculations of the demagnetising fields of magnetically recorded signals on magnetic tapes, it is expected that the external magnetic fields due to the recorded signals will, very close to the surface, be about equal to the coercivity of the magnetic tape for recorded signals of short wavelength and will fall off for recorded signals of longer wavelength. Dispersions of acicular magnetic particles having relatively low coercivities are therefore suitable for carrying out the present invention. For example, non-stoichiometric iron oxide particles having coercivities below 100 oersteds would be suitable.

In further embodiments of the invention, therefore, the second layer comprises acicular magnetic particles in a binder. The first layer may consist of a metal or alloy or a dispersion of magnetic particles in a binder. Signals are magnetically recorded on the first layer in selected regions in the form of a pattern or code. A second layer is formed on the first layer by applying a fluid coating of acicular magnetic particles dispersed in a binder and solvent, by a doctor blade applicator for example. Preferably the second layer uses a solvent compatible with the first layer so that merging occurs to provide a firm bond which resists separation of the layers. The coating must be sufficiently fluid to allow the magnetic particles at the selected regions to be orientated by the magnetic fields of the recorded signals. When the coating dries, the magnetic particles of the second layer will be fixed in position in the binder. In the selected regions of the second layer the particles will be orientated, while the remainder of the magnetic particles in the layer will be generally unorientated. The fixed magnetic particles will provide a physically structured "magnetic watermark" as before while the parts of the medium are again securely bonded together.

Although the method according to the invention has been described with reference to particular examples of magnetic materials, the method is applicable to any two layers of magnetic materials in which the second layer is orientated by the magnetic field of a signal magnetically recorded on the first layer. In general, square loop materials attaining saturation magnetisation in quite small magnetic field are eminently suitable for the second layer. The processes described may be carried out in any suitable order, not necessarily that in which steps are recited. Also, the first and second layers may be provided by processes other than those described. For example, in the case of metallic layers, they may be provided by other known metal plating processes.

In addition to the use for security purposes, the method can be employed for producing permanent magnetic recordings, i.e., recordings which cannot be destroyed by magnetic means. In this case, the second layer is applied to a first layer which contains a magnetic recording of the information to be made permanent, the orientations taken up by the second layer being in accordance with the signals recorded on the first layer.

The invention described above provides a security document which has an verification record which is permanent in that it can not be altered by damaging the medium, the parts of which are bonded together. Furthermore the record is easily formed during manufacture in that it can be recorded by conventional means, without recourse to special head arrays as proposed hitherto for certain methods of producing a watermark by structuring a magnetisable material. The invention also overcomes a limitation of previous proposals for forming a watermark by the action of the magnetic field from a recording head on a still-liquid oxide dispersion. This limitation is that the rheological properties of the dispersion restrict the watermark pattern to an information density much less (approx. 100 – 200 bits/inch) than that of magnetic tape itself. The use in the present invention of a magnetic medium to form the watermarking field permits the use of much higher information densities with consequent improvement in the watermark.

What I claim is:

1. A security document including a carrier and two layers of magnetisable material, one overlying the other, the carrier and the layers being bonded together, and the layers being an information record layer and a verification pattern record layer in which verification layer magnetic material in different parts of the layer is fixedly physically structured into a pattern of a magnetic property and in which the material of the verification layer is a metal or an alloy and has a Curie temperature below that of the material of the information layer.

2. A security document including a carrier and two layers of magnetisable material, one overlying the other, the carrier and the layers being bonded together, and the layers being an information record layer and a verification pattern record layer in which verification layer magnetic material in different parts of the layer is fixedly physically structured into a pattern of a magnetic property and in which the verification layer is formed of material evaporated directly on the information layer, which material is a metal or alloy.

3. A security document including a carrier and two layers of magnetisable material, one overlying the other, the carrier and the layers being bonded together, and the layers being an information record layer and a verification pattern record layer in which verification layer magnetic material in different parts of the layer is fixedly physically structured into a pattern of a magnetic property and in which the material of the verification layer is an oxide.

4. A document as claimed in claim 3 in which the material is anisotropic particles aligned in a particular direction in some regions of the layer to form the structured verification record.

5. A method of making a security document including the steps of providing a first layer of magetisable material, magnetising the layer with a verification pattern, depositing magnetisable material within the influence of the persisting verification pattern remanent magnetic field from the first layer and to form a second layer having a magnetic property physically structured in accordance with said verification pattern and bonding said first and second layers to a carrier forming part of said document.

6. A method as claimed in claim 5 including the step of depositing said second layer by vacuum evaporation of a metal or metal alloy so that the deposited layer cools through the Curie temperature of the metal or alloy within the influence of said remanent field.

7. A method as claimed in claim 5 including the step of depositing said second layer by coating with a dispersion of particles of oxide material.

8. A method as claimed in claim 5 including the step of depositing said first layer on a substrate to securely bond thereto.

9. A method as claimed in claim 5 including the step of demagnetising the first layer after the second structured layer has been deposited.

10. A security document made by the method claimed in claim 5.

* * * * *